June 22, 1954  M. HOLPFER  2,681,646
AIR INTAKE MECHANISM FOR INTERNAL-COMBUSTION ENGINES
Filed Oct. 1, 1952
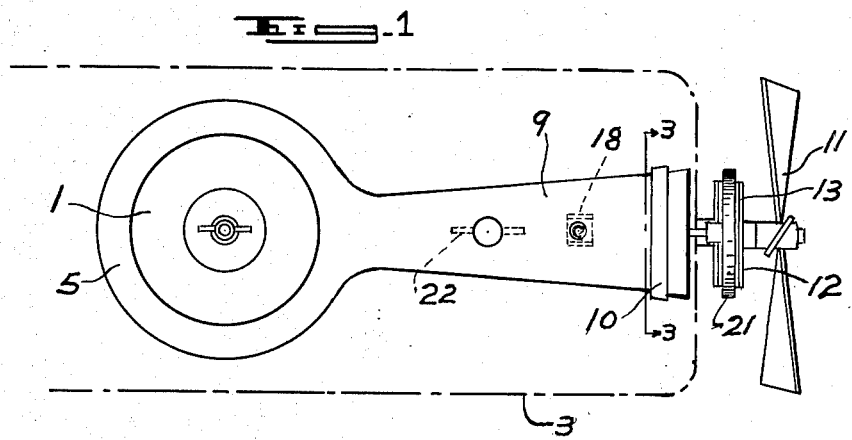
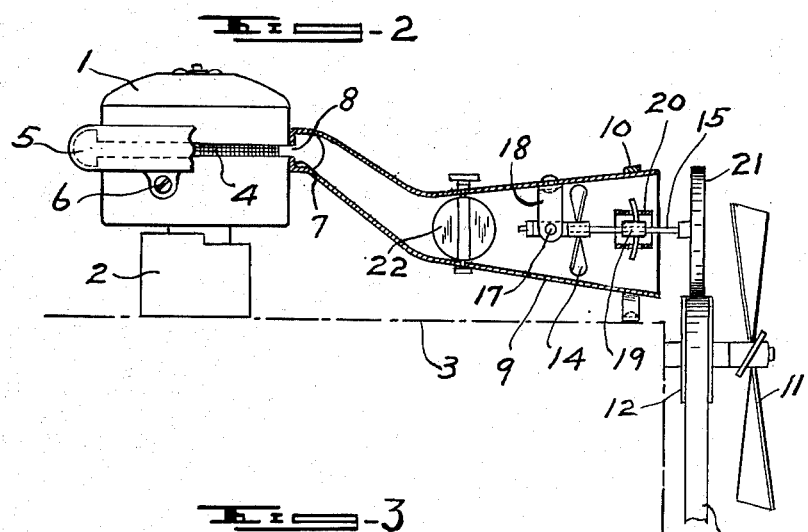
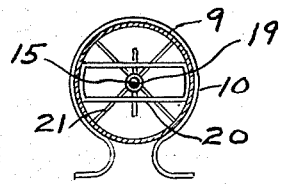
*INVENTOR.*
MARCUS HOLPFER
BY
*ATTORNEY*

Patented June 22, 1954

2,681,646

UNITED STATES PATENT OFFICE 2,681,646

AIR INTAKE MECHANISM FOR INTERNAL-COMBUSTION ENGINES

Marcus Holpfer, Pittsburgh, Pa.

Application October 1, 1952, Serial No. 312,506

1 Claim. (Cl. 123—119)

This invention relates to an improved air intake mechanism for the carburetor of an internal combustion engine, and the primary object thereof is to provide a mechanism of the character described, which will function to force the air through the air cleaner and carburetor of the engine to thereby greatly increase the efficiency of the engine with minimized fuel consumption.

Further important objects and advantages of the invention are to provide a device of the class described, which may be readily installed in an internal combustion engine already constructed as well as form a component part of a new engine structure, which is simple in its construction and arrangement, durable, compact, and comparatively economical in its manufacture, installation, operation and maintenance.

With the foregoing and other objects in view which will appear as the description proceeds, the invention resides in the novel construction, combination, and arrangement of parts herein specifically described and illustrated in the accompanying drawing, but it is to be understood that changes in the form, proportions, and details of construction may be resorted to that come within the scope of the claim hereunto appended.

In the drawing wherein like numerals of reference designate corresponding parts throughout the several views:

Figure 1 is a top plan view of an air intake mechanism, for internal combustion engines, constructed in accordance with the invention.

Figure 2 is a side elevational view thereof and being partly in cross section.

Figure 3 is a sectional view taken on line 3—3, Figure 1.

Referring in detail to the drawing, 1 denotes an air cleaner of the conventional construction, and being connected with the carburetor 2, in the usual manner, of an internal combustion engine indicated at 3 in dot and dash lines.

The air cleaner 1 is provided with a circumferentially extending opening 4 through which the air enters the air cleaner for filtering before entering the carburetor 2. The improved air intake mechanism comprises an annular, tubular member 5, which surrounds the air cleaner 1, and which is secured to the latter, as indicated at 6, in a manner to enclose or cover the opening 4 of the air cleaner. The inner wall 7 of the tubular member is provided with a slot 8, which extends throughout the circumference of said inner wall, and which is disposed in exact registration with the opening 4 in the air cleaner 1, as clearly illustrated in Figure 2.

Air is supplied to the air cleaner 1 by means of a horizontally disposed air intake tube 9 which is positioned above the engine 3. The air intake tube is tapered and has its reduced rearward end communicably joined with the tubular member 5. The enlarged forward end of the air intake tube is open and is disposed adjacent to the forward end of the engine. The air intake tube is fixed in position by a band 10, which surrounds the forward end of the air intake tube and which is secured to the latter and to the engine 3.

From the foregoing description of the device, it will be obvious that all air passing through the air cleaner 1 into the carburetor 2 must flow through the air intake tube 9 and through the tubular member 5. Such flow of the air to the carburetor is induced with considerable force, first, by the normal suction action effected by the operating engine 1, second, by the travelling speed of the motor vehicle, and third, by the operation of the engine fan 11, which is driven by the pulley 12 and fan belt 13, in the usual well known manner, during the operation of the engine. The air intake tube 9 is so positioned on the engine that the enlarged open forward end thereof is disposed directly rearward of the outer end portions of the blades of the engine fan 11, as clearly shown in Figure 2.

It will here be noted that the speed of the operating engine 1 in conjunction with the speed of travel of the motor vehicle will automatically regulate the force of the air flow to the carburetor 2 through the improved air intake mechanism, as such variable speeds will increase or diminish the force of the air flow to the optimum degree for most efficient engine performance.

To increase the force of the air flow, if required, a blower 14 may be mounted in the air intake tube 9. The blower 14 is fixed on a drive shaft 15. The drive shaft has its rearward end journaled in a bearing 16, which is pivotally supported, as at 17, in a hanger 18 that is fixed in the air intake tube. A floating bearing 19 supports the outer end of the shaft 15 and is longitudinally shiftable on the latter. The bearing 19 is mounted in a supporting bracket 20 in a manner to allow the former to shift vertically in the latter together with the drive shaft. The bracket in the air intake tube is fixed in position in the latter.

The blower 14 is operated by a driving wheel 21, which is secured to the outer end of the shaft 15 and has a gravity traction engagement on the fan belt 13 of the engine. The air flow may be controlled and regulated by the adjustment of a suitable control valve 22, which is mounted in the air intake tube at a position rearwardly of the blower 14.

Exhaustive and extensive experiments and tests have proven that induced air flow to the fuel mixture, in accordance with the present invention, will greatly augment the efficiency of the engine performance with great savings in fuel consumption.

The present invention provides a most efficient device of its kind, which may be economically constructed and installed, and successfully employed for the purposes and in the manner herein set forth.

What I claim is:

An air intake mechanism for an internal combustion engine including an air cleaner provided with an air inlet opening comprising, a tubular member communicably joined with the air cleaner and enclosing the air inlet opening, a horizontally disposed air intake tube mounted on the engine, said tube being tapered and having the enlarged forward end thereof disposed at the forward end of the engine, means mounted in said tube and being operatively connected with the engine for inducing a forced air flow through said member and through the air cleaner, and adjustable control means mounted in said tube for regulating the air flow through said member and the air cleaner.

References Cited in the file of this patent

UNITED STATES PATENTS

| Number | Name | Date |
|---|---|---|
| 1,616,593 | Milton | Feb. 8, 1927 |
| 1,717,369 | Clements | June 18, 1929 |
| 1,775,238 | Fellows | Sept. 9, 1930 |
| 2,114,783 | Kowitt | Apr. 19, 1938 |
| 2,584,033 | Laserson | Jan. 29, 1952 |